United States Patent [19]

Evans et al.

[11] Patent Number: 4,932,489
[45] Date of Patent: Jun. 12, 1990

[54] STEERING AND DRIVE MEANS FOR ROBOT VEHICLE

[75] Inventors: John M. Evans, Brookfield; Robert B. Croston, Danbury; Wilbur N. Roberts, Newtown, all of Conn.

[73] Assignee: Transitions Research Corporation, Danbury, Conn.

[21] Appl. No.: 178,624

[22] Filed: Apr. 7, 1988

[51] Int. Cl.[5] .................. B62D 1/00; B62D 57/00; B62D 61/12

[52] U.S. Cl. ................ 180/6.2; 180/7.1; 180/252

[58] Field of Search ........... 180/7.1, 21, 22, 23, 180/24.01, 24.03, 24.06, 24.07, 6.2, 6.48, 6.5, 6.66, 199, 202, 209, 79.1, 908, 8.5, 252, 253; 280/47.16

[56] References Cited

U.S. PATENT DOCUMENTS

| | | | |
|---|---|---|---|
| 1,733,356 | 10/1929 | Mossay | 180/24.07 |
| 3,154,162 | 10/1964 | McCaleb et al. | 180/21 X |
| 3,700,058 | 10/1972 | Kuwahara | 180/21 |
| 3,876,026 | 4/1975 | Pronasko | 180/23 |
| 3,938,608 | 2/1976 | Folco-Zambelli | 180/21 |
| 4,041,678 | 8/1977 | Chaney | 180/21 |
| 4,078,630 | 3/1978 | Krieg | 180/6.5 |
| 4,221,273 | 9/1980 | Finden | 180/6.48 |
| 4,223,753 | 9/1980 | Bradbury | 180/21 |
| 4,694,923 | 9/1987 | Grenzicki | 180/6.5 |

FOREIGN PATENT DOCUMENTS

| | | | |
|---|---|---|---|
| 4471 | 1/1982 | Japan | 180/252 |
| 63575 | 4/1983 | Japan | 180/907 |
| 4630 | 1/1987 | Japan | 180/7.1 |

Primary Examiner—Mitchell J. Hill
Attorney, Agent, or Firm—Kramer, Brufsky & Cifelli

[57] ABSTRACT

A vehicle has been provided with a first load carrying frame having freely rotatable supporting wheels attached thereto. A second frame in non-rotable and compliantly suspended from the first frame. A device is mounted to the second frame for driving and steering the vehicle.

28 Claims, 4 Drawing Sheets

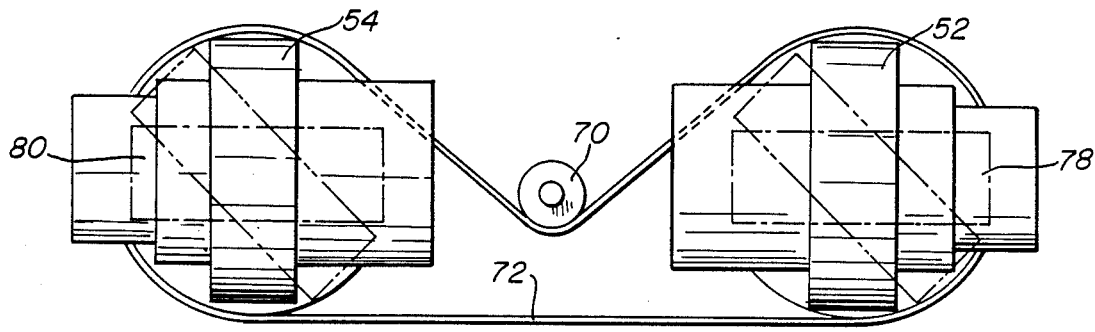
FIG. 2
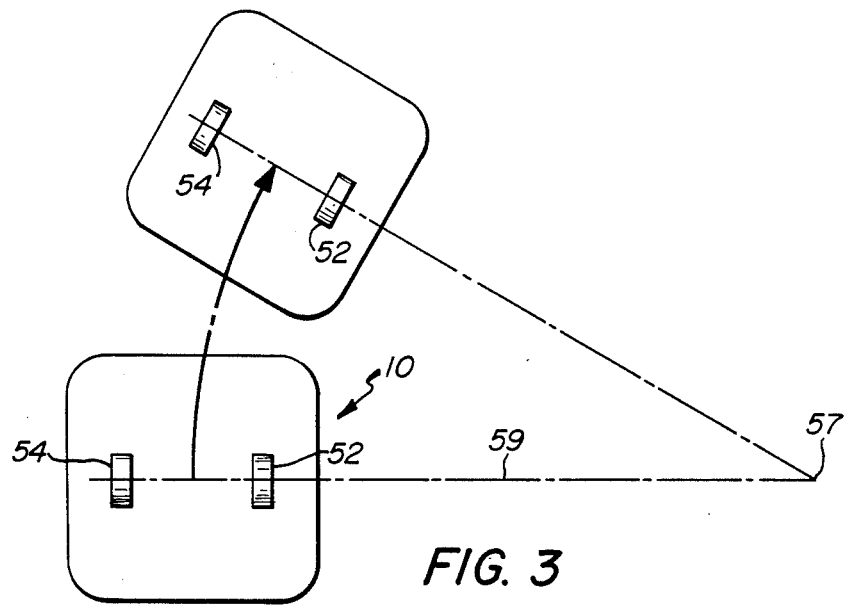
FIG. 3
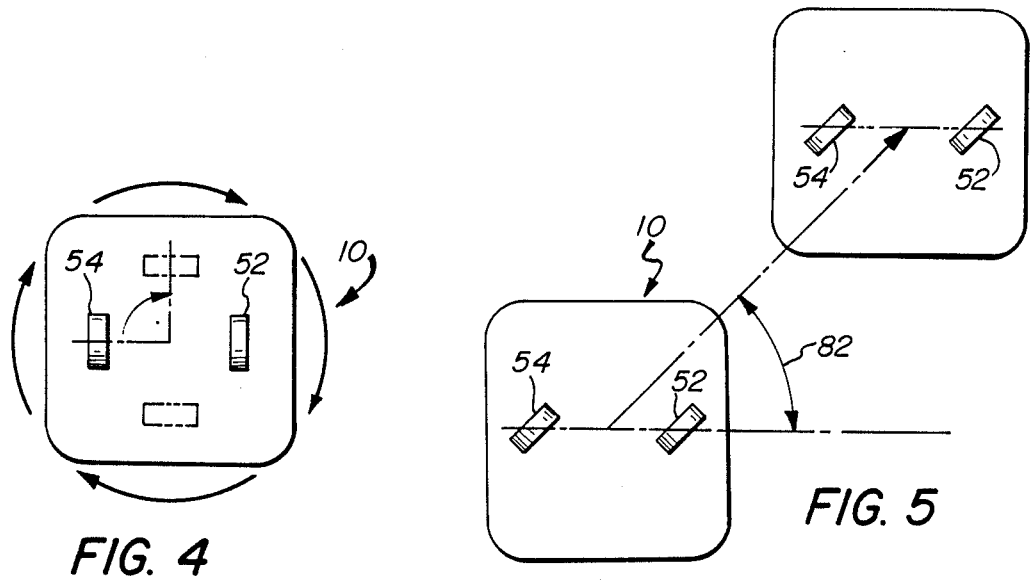
FIG. 4
FIG. 5

STEERING AND DRIVE MEANS FOR ROBOT VEHICLE

BACKGROUND AND DESCRIPTION OF THE INVENTION

While the present invention is subject to a wide range of applications, it is particularly suited for autonomous or robot type vehicles which are intended to operate and to navigate independently under computer control and in particular to improvements in the drive and steering design for these vehicles.

During autonomous navigation of vehicles in constrained spaces, it is highly desirable for them to have the ability to move and rotate in any direction. This ability is particularly important in indoor spaces. Further, there are instances in which it is desirable to provide these vehicles with the ability to move without rotation or to turn without translation because of external constraints. Also, vehicles with preferred direction of motion required by factors such as placement of sensors, arms or other tooling, are preferably able to translate sideways without rotating. Moreover, it is desirable to enable vehicles to rotate about an arbitrary point in confined spaces.

In the past, a number of vehicles have incorporated a plurality of caster wheels positioned around the outer edge of the vehicle body and surrounding a driving and possibly steering wheel. Examples of this type of construction are disclosed in U.S. Pat. Nos. 3,700,058; 3,876,026; 3,938,608; and 4,694,923.

However, none of these patents disclose a system which can be relatively easily controlled to determine the position and orientation of the vehicle, provide solid directional control, and develop adequate friction with the running surface.

U.S. Pat. No. 4,221,273 to Finden relates to a steerable and motor driven vehicle with a single vertical center axis about which the driving wheels are rotated. By contrast, the present invention incorporates two separate traction wheels which are steered by a steering motor about separate axes.

It is a problem underlying the present invention to provide a vehicle which can be relatively easily steered and driven under computer control.

It is an advantage of the present invention to provide a vehicle which obviates the limitations and disadvantages of the prior art.

It is a further advantage of the present invention to provide a vehicle which has the ability to execute arbitrary radius turns.

It is a still further advantage of the present invention to provide a vehicle which can execute zero radius turns.

It is a yet further advantage of the present invention to provide a vehicle for lateral translation with fixed orientation in any direction from a point.

It is a still further advantage of the present invention to provide a vehicle with conventional wheels having the ability to rotate about an arbitrary point at any position and at any distance from the vehicle.

Accordingly, there has been provided a vehicle constructed of a first load-carrying frame having freely rotable supporting wheels attached thereto. A second frame is non-rotably and compliantly suspended from the first frame. A device is mounted to the second frame for driving and steering the vehicle.

BRIEF DESCRIPTION OF THE DRAWINGS

The invention will be illustratively described for preferred and other embodiments, in conjunction with the accompanying drawings, in which:

FIG. 2 is a schematic illustration of the two driving wheels and the three actuators for controlling their speed and location;

FIGS. 3 through 6 show various capabilities of the vehicle control for rotating and translating the vehicle;

DETAILED DESCRIPTION OF THE PREFERRED EMBODIMENT

Figure 1:
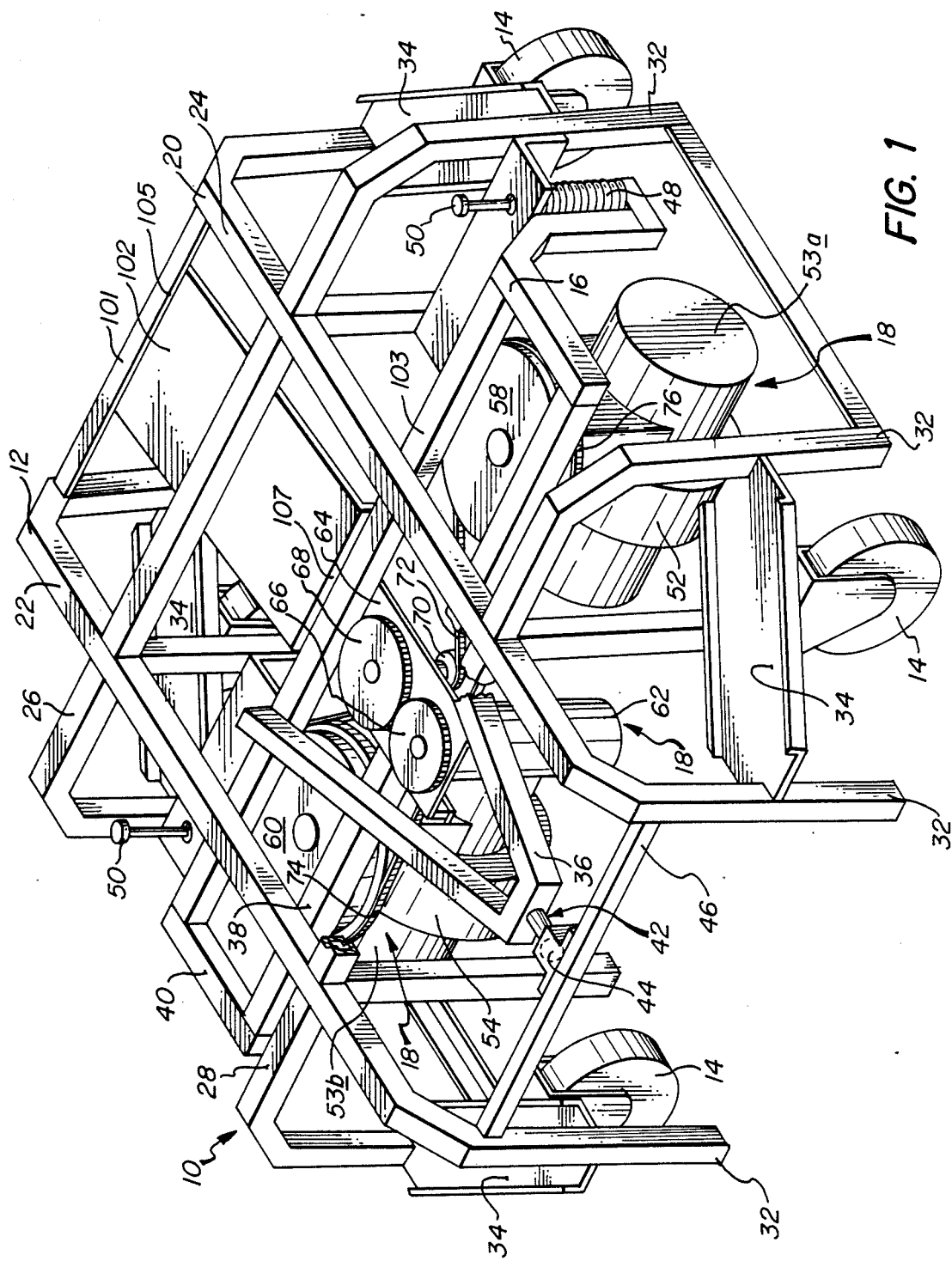
FIG. 1 is an isometric view of a preferred embodiment of the present invention wherein three actuator devices provide for translation in any direction or rotation of any radius about a center on the driving wheel axis.

Referring to FIG. 1, there is shown a vehicle 10 having a first load carrying frame 12 with freely rotatable supporting wheels 14 attached thereto. A second frame 16 is non-rotatably and compliantly suspended from the first frame 12. Structure 18 is mounted to the second frame 16 for driving and steering the vehicle 10.

Referring again to FIG. 1, there is illustrated the isometric view of a vehicle 10 which is particularly useful for navigating independently under computer 17 control and includes a unique drive and steering design. A first load carrying frame 12 is illustrated with an uppermost surface 20 formed from the flat surfaces of structural members 22, 24, 26 and 28. The load carrying frame 12 includes a plurality of side frame elements 32 which extend downwards from the structural members toward, but not in contact with, the surface upon which the vehicle rides. Although the frame design as illustrated in FIG. 1 is very rigid and useful for a computer controlled vehicle of the type described herein, it is within the terms of the present invention to form the load carrying frame member of any desired configuration as required.

A plurality of freely rotatable, supporting wheels 14, such as conventional caster wheels, are attached to the load carrying frame 12. Preferably, these are conventional caster wheels and are provided to support the load disposed on frame 12. The passive wheels 14 are illustrated as being connected to brace members 34. However, it is within the terms of the invention to attach wheels 14, by any desired means, to vehicle 10 in order that they support a load disposed on the frame 12, and are sufficiently outward from the center of gravity to prevent the vehicle from tipping over Referring again to FIG. 1, there is illustrated a second frame 16 which is non-rotating and compliantly suspended from the first frame 12 as described below. The second frame includes a triangularly shaped structural member 36 which is connected to the top surface 38 of a relatively rectangular structural component 40. One end of the triangular structure 36 is pivotally connected at a first location by a ball joint structure 42 to the load carrying frame 12. Typically, the ball joint structure 42 includes a bracket 44 which is securely connected to a cross element 46 positioned between two legs 32 of the frame 12. The ball joint enables the frame 16 to move universally with respect to frame 12. Although a ball joint is preferred, it is within the terms of the present invention to connect the triangular structure 36 to the cross element 46 by any desired means.

At the opposite side from the ball joint structure 42, second frame 16 is connected to first frame 12 at the horizontal member 101 of frame 12 at a second location by means of a flexible rectangular metal plate 102. The attachment of plate 102 to frame member 101 is rigid along the joining edge 105. The attachment of the other end of plate 102 to frame member 103 of second frame 16 is also rigid along the joining edge 107. Plate 102 and its method of attachment comprise a suspension element which permits the second frame 16 to move up and down relative to first frame 12, and to twist relative to first frame 12 about a horizontal axis through the midpoint of the plate and the ball joint. The plate constrains, however, horizontal relative motion of the second frame 16 with respect to first frame 12, and also constrains twisting motion of the second frame 16 with respect to first frame 12, about a vertical axis. Together, the ball joint 42 and thin plate 102 permit the drive wheels to move up and down independently to accommodate local unevenness in floor surface, bumps, door sills, edges of carpet, electrical cords etc., while maintaining solid contact with the floor and providing laterally rigid drive force to the load carrying frame 12.

Two other points of the frame 16 can be connected at a third and fourth location to the frame 12 by a compliant means such as coil springs 48. The coil springs can be adjusted by adjustment screws 50 to regulate the spring force of coil springs 48 in accordance with the load carried by the frame 12. If the load is very heavy, the springs are tightened so that an appropriate share of the load force is transmitted to the driving wheels 52 ad 54 to avoid slippage. On the other hand, if the load is relatively light, the springs are loosened to ensure that the passive wheels 14 are not lifted from the floor. Although the preferred embodiment incorporates springs, it is within the terms of the present invention to substitute equivalent means such as air pistons and shock absorbers.

The driving and steering structure 18 includes two driving wheels 52 and 54 which are attached to the plates 58 and 60. The plates 58 and 60 are secured to the frame 16. Each of the drive wheels 52, 54 preferably contains drive motors 53a and 53b and gearing in the hub of the wheels as is conventionally known. However, it is within the scope of the present invention to mount the drive motors separate from the wheels if desired. The driving motors 53a and 53b, which can, for example, be electric motors, can be independently controllable by appropriate control means such as computer 17. The power to the electric motors 53a and 53b can be supplied from batteries (not shown) which can be mounted to the frame 12. Also, the drive wheels preferably have tires to increase the friction with the floor upon which the vehicle is operated.

When the drive wheels 52 and 54 are pointed forward, the vehicle 10 can move forward, in reverse or even execute turns, including zero radius turns, by driving the wheels 52 and 54 at different velocities. FIG. 3 is a schematic illustration of a vehicle 10 turning at a radius 59 about a point 57. This turn occurs when drive wheels 52 and 54 are driven forward or backward at different speeds.

A vehicle 10 can negotiate a zero radius turn, as shown in FIG. 4, when one drive wheel 54 is driven forward and the other drive wheel 52 is driven backward at the same speed.

Translational movement of the vehicle 10 can also be accomplished by varying the direction of the wheels 52 and 54. Referring again to FIG. 1, a motor 62 is mounted to a plate 64 fixed to the second frame 16. The motor 62 can drive a gear 66 which, in turn, drives a gear 68. The gear 68 drives a sprocket 70 which, in turn, drives chain 72 and sprockets 74 and 76. The latter sprockets 74, 76 are affixed to the drive wheel support housings whereby the drive motor 62 can rotate the planes of the drive wheels 52 and 54 such that the planes of the wheel remain parallel while pointing away from the forward direction. Alternatively, gearing may be used instead of chain and sprocket.

Referring to FIG. 2, a schematic plan view illustrates the drive wheels 52, 54 pointed in the forward direction and the sprocket 70 which drives the chain 72 to change the direction of the wheels 52 and 54 to a new direction as shown in phantom. The planes of rotation of wheels 52 and 54 can be rotated plus or minus 90 degrees to allow sideway translation movement indicated by the location of the wheels 52 an 54 in the phantom location 78 and 80.

Referring to FIG. 5, there is shown the movement of vehicle 10 resulting from disposing the wheels 52, 54 at an angle 82 and driving the wheels at the same velocity.

Figure 6:
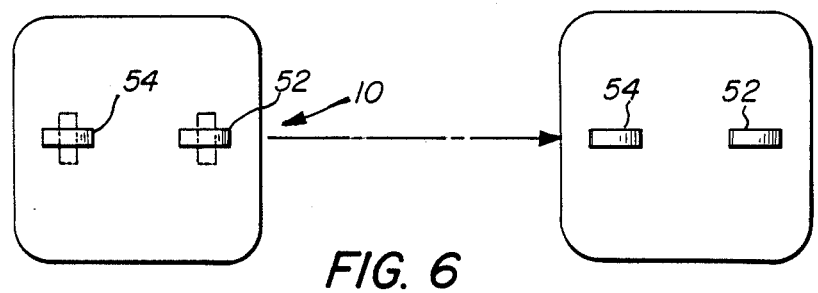

Referring to FIG. 6, the planes of rotation of wheels 52, 54 are illustrated as being rotated 90 degrees from their initial position as shown in phantom. It is important that the drive motors be run at the same velocity when the wheels are positioned as illustrated in FIG. 6 to avoid an over constrained mechanical system.

Figure 7:
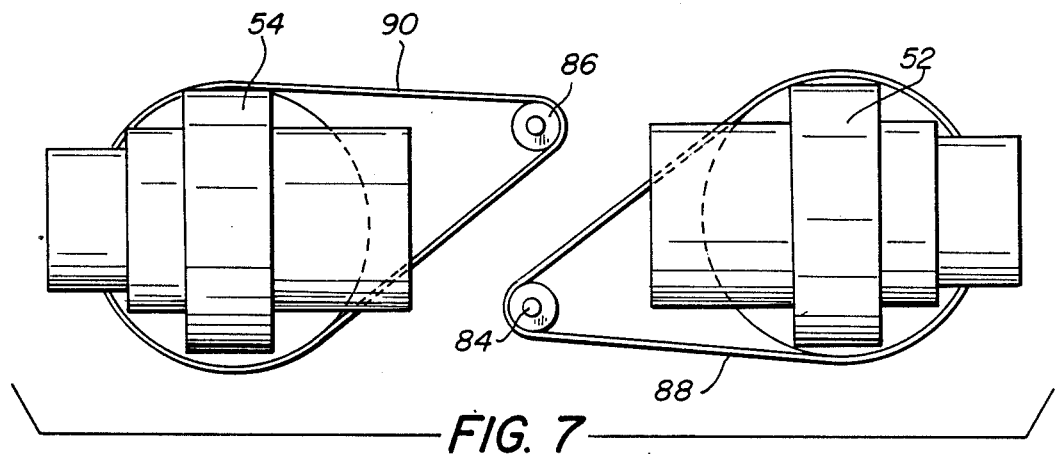
FIG. 7 shows a second embodiment of the present invention wherein two actuators are provided for each of the two driving wheels.

The second embodiment of the present invention is illustrated in FIG. 7 wherein two sprockets 84 and 86, each powered by an individual steering motor (not shown), are provided to independently orient the planes of rotation of their respective wheels 54 and 52. The plan view illustrated in FIG. 7 illustrates that the two steering motors drive sprockets 84 and 86 which in turn drive chains 88 and 90 to independently orient the planes of drive wheels 52 and 54.

Figure 8:
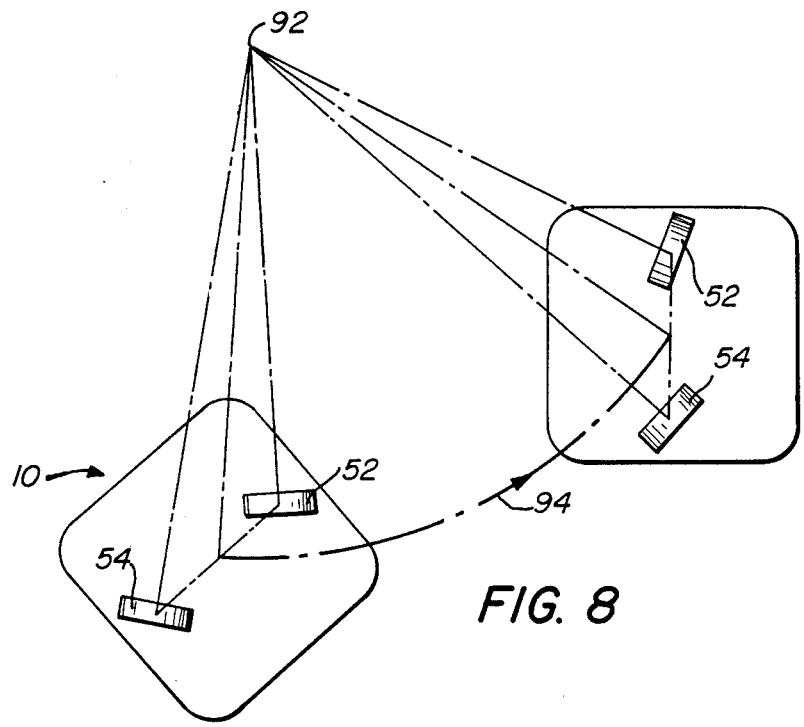
FIG. 8 illustrates the ability of the vehicle to turn about centers off of the driving wheel axis which can be accomplished by the four actuator scheme.
Figure 9:
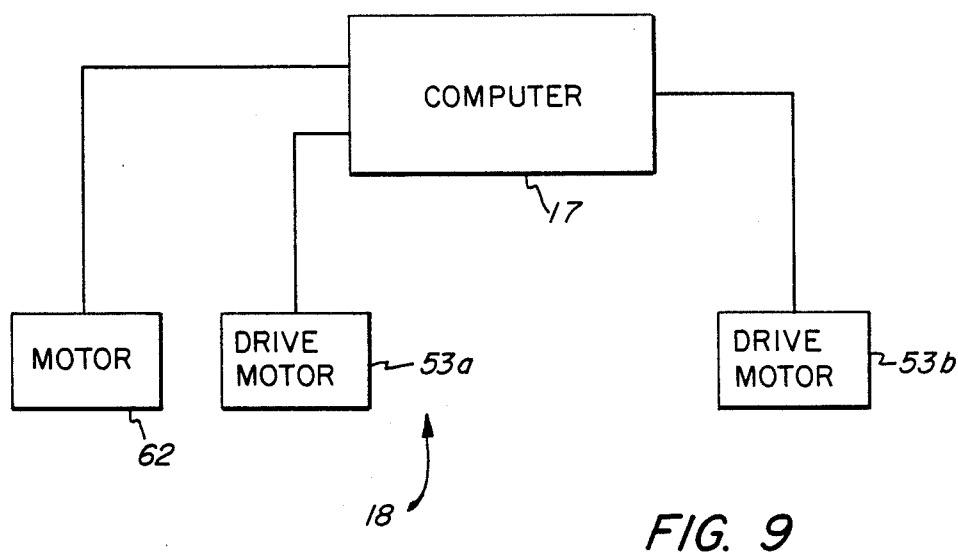
FIG. 9 is a block diagram illustrating the computer control of the drive and steering mechanism.

FIG. 8 illustrates the capabilities of a drive arrangement incorporating individual steering motors, as described and illustrated with respect to FIG. 7. Rotation of vehicle 10 about an arbitrary center point 92 in space may be accomplished by orienting the normals to the planes of the wheels to intersect at the center point 92 of rotation. Driving the wheels such that the relative velocities are proportional to the distance from the center point of rotation will drive the vehicle 10 in an arc 94 as shown. Note that by suitably adjusting the steering and drive velocities, the orientation of the vehicle can be modified with respect to the circular path 94.

The patents set forth in this specification are intended to be incorporated in their entireties by reference herein.

It is apparent that there has been provided in accordance with this invention a vehicle which satisfies the objects, means and advantages set forth hereinbefore. While the invention has been described in combination with the embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A vehicle, comprising:
   a first load-carrying frame having freely, rotatable, supporting wheels attached thereto;
   a second frame suspended from said first frame;
   means mounted to said second frame for driving and steering said vehicle, said driving and steering means comprising first and second drive means mounted to said second frame; and
   means for suspending said second frame from said first frame at a plurality of locations; said suspending means enabling first and second drive wheels to move independently towards and away from said first frame.

2. The vehicle of claim 1 wherein said driving and steering means further comprises:
   first and second drive actuator means, said first and second drive actuator means being each independently connected to said first and second drive wheels, respectively.

3. The vehicle of claim 2 wherein said driving and steering means further comprises steering actuator means operatively connected to said first and second drive wheels for simultaneously turning said drive wheels so that said drive wheels always remain substantially parallel to each other.

4. The vehicle of claim 3 wherein
   said second frame is connected to said first frame at no less than four locations;
   said second frame is pivotably connected at a first location to said first frame;
   said second frame is connected at a second location to said first frame by a suspension element which constrains horizontal translational and rotational motion of said second frame with respect to said first frame; and
   said second frame is resiliently mounted at third and fourth locations to said first frame.

5. The vehicle of claim 4 wherein the resilient mounting comprises adjustable springs mounted between the first and second frames at the third and fourth locations.

6. The vehicle of claim 5 wherein the pivotable mounting comprises a ball joint.

7. The vehicle of claim 5 wherein a suspension element for constraining horizontal motion of the second frame with respect to the first frame, is a thin metal plate horizontally linking the two frames.

8. The vehicle of claim 4 wherein said first and second drive actuator means each comprises first and second motors.

9. The vehicle of claim 8 wherein said first and second motors are mounted in the hub of each wheel.

10. The vehicle of claim 4 wherein said steering actuator means further comprises:
    a power drive; and
    means for transmitting the power from the power drive to said first and second drive wheels for orienting said first and second drive wheels so that said drive wheels always remain substantially parallel to each other.

11. The vehicle of claim 10 wherein the transmitting power means comprises a third motor and a chain drive connected to said third motor and said first and second drive wheels.

12. The vehicle of claim 2 wherein said driving and steering means further comprises first and second steering actuator means independently connected to said first and second drive means for independently orienting said drive wheels.

13. The vehicle of claim 12 wherein
    said second frame is connected to said first frame at no less than four locations;
    said second frame is pivotably connected at a first location to said first frame;
    said second frame is connected at a second location for constraining lateral movement with respect to said first frame; and
    said second frame is resiliently mounted at third and fourth locations to said first frame.

14. The vehicle of claim 13 wherein the resilient mounting comprises adjustable springs mounted between the first and second frames at the third and fourth locations.

15. The vehicle of claim 14 wherein the pivotable mounting comprises a ball joint.

16. The vehicle of claim 15 further comprising a flexible metal plate which connects the first and second frames to each other.

17. The vehicle of claim 13 wherein said first and second drive actuator means comprises first and second motors.

18. The vehicle of claim 17 wherein said steering actuator means further comprises a power drive and means for transmitting the power from the power drive to said first and second drive wheels for independently orienting said first and second drive 19. The vehicle of claim 1 wherein said means for suspending further includes compliant means for adjusting the degree of load force transmitted from the first frame to the second frame.

20. The vehicle of claim 19 wherein the compliant means comprises spring means connected between said first frame and said second frame at third and fourth locations.

21. The vehicle of claim 20 wherein said spring means is adjustable.

22. The vehicle of claim 1 wherein said means for suspending further includes means for connecting said second frame to said first frame at a first location.

23. The vehicle of claim 22 wherein said means for suspending further includes means for connecting said second frame to said first frame at a second location for constraining horizontal translation and rotational motion of said second frame with respect to said first frame.

24. The vehicle of claim 23 wherein said means for constraining horizontal translational and rotational motion comprises a suspension element.

25. The vehicle of claim 24 wherein said means for connecting said second frame to said first frame at a first location comprises a pivotably connecting means.

26. The method of driving and steering a vehicle, comprising the steps of:
    providing a first load-carrying frame having a plurality of freely rotatable, supporting wheels attached thereto;
    suspending a second frame from said first frame;
    mounting first and second drive wheels to said second frame for driving and steering said vehicle;
    suspending said second frame from said first frame at a plurality of locations whereby said first and second drive wheels move independently towards and away from said first frame; and simultaneously orienting said drive wheels so that said drive wheels remain substantially parallel to each other.

27. The method of claim 26 further including the step of driving said drive wheels at the same speed to obtain vehicle translation without vehicle rotation.

28. The method of claim 26 further including the steps of:

orienting said drive wheels so that a center of each of the two drive wheels, about which the drive wheels rotate, coincide with each other; and driving said drive wheels at different speeds to turn the vehicle about any point between the centers of the two drive wheels, including zero radius turns about the center of the vehicle.

* * * * *

UNITED STATES PATENT AND TRADEMARK OFFICE
CERTIFICATE OF CORRECTION

PATENT NO. : 4,932,489
DATED : June 12, 1990
INVENTOR(S) : John M. Evans; Robert B. Croston; Wilbur N. Roberts It is certified that error appears in the above-identified patent and that said Letters Patent is hereby corrected as shown below:

Column 5, in claim 1, line 12, after "drive", delete
    "means" and insert in lieu thereof -- wheels --.

Column 6, in claim 18, line 33, after "drive",
    insert -- wheels -- .

Signed and Sealed this

Sixteenth Day of July, 1991

Attest:

HARRY F. MANBECK, JR.

*Attesting Officer*       *Commissioner of Patents and Trademarks*